United States Patent [19]

Wyczalek et al.

[11] Patent Number: 4,864,151
[45] Date of Patent: Sep. 5, 1989

[54] EXHAUST GAS TURBINE POWERED ELECTRIC GENERATING SYSTEM

[75] Inventors: Floyd A. Wyczalek, Birmingham; Stanley H. Mick, Mt. Clemens, both of Mich.

[73] Assignee: General Motors Corporation, Detroit, Mich.

[21] Appl. No.: 200,230

[22] Filed: May 31, 1988

[51] Int. Cl.⁴ ............................................. F02B 37/00
[52] U.S. Cl. .................................. 290/52; 290/40 C; 60/597
[58] Field of Search ................ 290/40 R, 40 B, 40 C, 290/40 F, 52; 60/597, 601, 602, 603, 605, 608

[56] References Cited

U.S. PATENT DOCUMENTS

| | | | |
|---|---|---|---|
| 4,038,558 | 7/1977 | Gallois | 290/52 |
| 4,394,582 | 7/1983 | Kreissl et al. | 290/52 X |
| 4,672,814 | 6/1987 | Abo et al. | 60/602 |
| 4,680,933 | 7/1987 | Bozung et al. | 290/52 X |
| 4,694,653 | 9/1987 | Kawamura | 290/52 X |
| 4,694,654 | 9/1987 | Kawamura | 290/52 X |
| 4,745,754 | 5/1988 | Kawamura | 290/52 X |
| 4,745,755 | 5/1988 | Kawamura | 290/52 X |
| 4,757,686 | 7/1988 | Kawamura et al. | 290/52 X |
| 4,769,993 | 9/1988 | Kawamura | 290/52 X |
| 4,774,811 | 10/1988 | Kawamura | 290/52 X |

Primary Examiner—William M. Shoop, Jr.
Assistant Examiner—W. E. Duncanson, Jr.
Attorney, Agent, or Firm—C. R. Meland

[57] ABSTRACT

An exhaust gas turbine powered electric generating system for supplying electrical loads on a motor vehicle. The inlet of the gas turbine is supplied with the exhaust gas of an internal combustion engine. The effective turbine inlet area is controlled by a valve which is adjusted as a function of the output current of the generator. As generator output current increases the valve is adjusted to decrease turbine inlet area thereby increasing engine back pressure which tends to slow the engine down. An idle speed control is provided which in response to engine slow-down increases the amount of air and fuel supplied to the engine to thereby increase the exhaust gas mass flow supplied to the turbine.

3 Claims, 1 Drawing Sheet

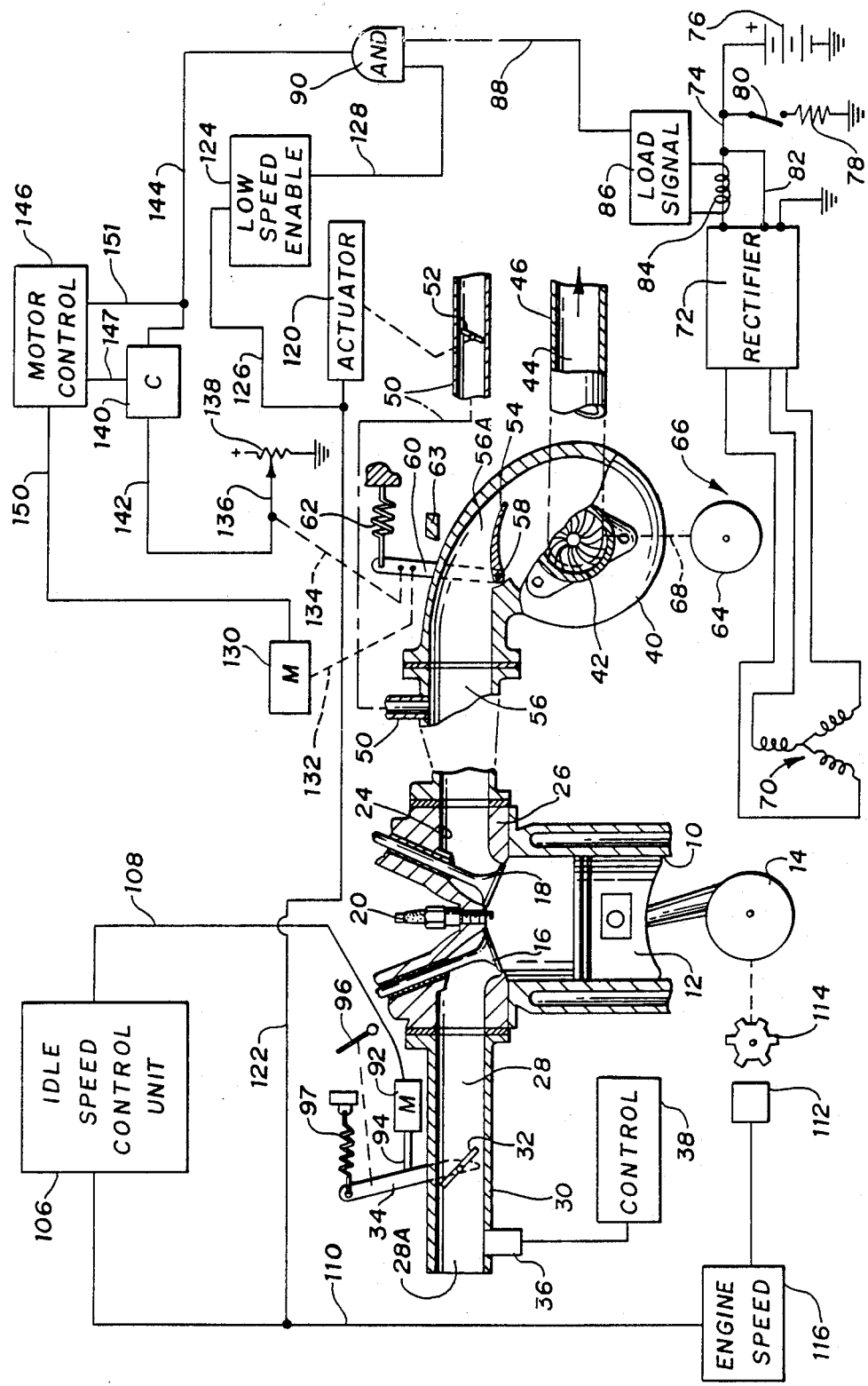

EXHAUST GAS TURBINE POWERED ELECTRIC GENERATING SYSTEM

This invention relates to a system for generating electric power for the electrical loads on a motor vehicle and more particularly to a system wherein the exhaust gas of an internal combustion engine is supplied to an exhaust gas turbine which drives an electric generator that supplies electrical power to the electrical loads on the vehicle.

Systems that drive an electric generator from an exhaust gas turbine that is supplied with the exhaust gas of an internal combustion engine are known, examples being the systems disclosed in the U.S. Pat. Nos. to Kawamura 4,694,653 and 4,694,654.

When driving an electric generator from an exhaust gas turbine, where the turbine is fed by the exhaust gas of an internal combustion engine, it is possible that at engine idle speed there will not be enough gas generated in terms of engine exhaust mass flow to drive the turbine at a speed that is sufficient to cause enough electric power to be generated by the generator to accommodate the electric loads on the vehicle. This is particularly true where there is a high electrical load on the generator.

It accordingly is an object of this invention to provide an electric generating system for a motor vehicle wherein an exhaust gas turbine that drives an electric generator is supplied with the exhaust gas of an internal combustion engine and wherein the system is so controlled that the turbine is supplied with sufficient exhaust gas mass flow at engine idle to cause the generator to be driven at a speed that is high enough to satisfy the electrical loads on the vehicle. In a preferred arrangement for accomplishing this object the gas turbine is provided with a controllable inlet valve that can control the exhaust gas input to the turbine. As this valve moves toward a closed position, engine back pressure increases thereby tending to reduce engine speed. The engine has an idle speed control system and as engine speed decreases below a set idle speed the throttle valve on the intake side of the engine is moved to a more open position with the result that more air and fuel is supplied to the intake side of the engine. The net result of this is that exhaust gas mass flow of the engine is increased which tends to increase turbine speed or at least maintain turbine speed at some value that is high enough to cause sufficient power to be generated by the electric generator that is driven by the turbine. Further, the system of this invention includes means for sensing the output current of the generator and for adjusting the inlet valve of the turbine as a function of the output current of the generator.

IN THE DRAWING

The single FIGURE drawing illustrates an exhaust gas turbine electric generating system made in accordance with this invention.

Referring now to the drawing, the reference numeral 10 designates one cylinder of an internal combustion engine. A piston 12 reciprocates in the cylinder which is connected to crankshaft 14. The cylinder has an intake valve 16 and exhaust valve 18 and is fitted with a spark plug 20 that is connected to a suitable ignition system (not illustrated). The exhaust valve 18 is connected to exhaust passage 24 provided by a pipe 26 so that the exhaust gas of the engine is supplied to exhaust passage 24.

The intake valve communicates with an intake passage 28 provided by pipe 30. A pivotable throttle plate or throttle valve 32 is positioned within the intake passage 28 and is connected to pivotable actuating lever 34. The intake passage 28 can be supplied with fuel by a fuel injector 36 controlled by fuel control device 38. The inlet end 28A of the inlet passage 28 is the air inlet of the engine and can be connected to an air cleaner or filter. The end 28A is at atmospheric pressure.

The drawing illustrates only one cylinder of an internal combustion engine. It is to be understood that the engine has more than one cylinder and all of the exhaust valves, like valve 18, of all cylinders are connected to exhaust passage 24 via, for example an exhaust manifold. The same is true of intake passage 28, that is, it is connected to all of the intake valves 16 of all of the cylinders of the engine. The exhaust gas in exhaust passage 24, which is developed by the engine, is supplied to the inlet of a gas turbine 40 that has a rotor 42. This turbine is of the known radial inlet axial exhaust type and the axial exhaust of the turbine is via exhaust passage 44 provided by pipe 46. The turbine 40 can be bypassed by conduit or exhaust passage 50 which has an inlet connected to passage 24. Located in the exhaust passage 50 is a waste gate throttle valve 52.

The turbine has an inlet control valve 54 which cooperates with inlet passage 56 and with internal walls of the turbine. The valve 54 is vane-shaped and is connected to a pivotally mounted pin or rod 58. Valve 54 is connected to an actuator lever 60 by pivotally mounted pin 58 so that valve 54 is moved by lever 60. As valve 54 is moved counterclockwise it tends to reduce the effective turbine inlet area 56A and as it moves clockwise it tends to increase the effective turbine inlet area. As will be more fully described hereinafter the position of valve 54 will control engine back pressure in passage 24; that is, back pressure increases as valve 54 moves toward a closed position (area 56A reduced) and back pressure decreases as valve 54 moves toward a fully open position (area 56A increased). Exhaust gas flow is therefore variably throttled, dependent upon the position of valve 54. The turbine inlet valve 54 can be of the type disclosed in U.S. Pat. No. 4,633,670 or could be of the type disclosed in U.S. Pat. Nos. 4,214,850 and 3,313,518.

The valve 54 is spring biased to a fully open position by a spring 62 connected to lever 60. This spring urges lever 60 clockwise to a position where it engages a fixed stop 63. When lever 60 engages stop 63, valve 54 is in a fully open position. As will be more fully described hereinafter, the valve 54 is adjusted in accordance with the load that is applied to turbine 40 by an electrical generator.

The rotor 42 of turbine 40 is connected to the rotor 64 of an alternating current generator 66 by a shaft 68 illustrated by a dotted line. The generator has a three-phase, Y-connected stator winding 70. The generator 66 is a permanent magnet alternating current generator and accordingly the rotor 64 is provided with permanent magnets (not illustrated) in a known manner. The generator rotor 64 is driven by the turbine rotor 42 through shaft 68 so that the generator rotor 64 rotates at the same speed as the turbine rotor.

The stator or output winding 70 is connected to a three-phase, full-wave bridge rectifier 72 that is of the type disclosed in the U.S. Pat. No. to Cummins et al.

3,427,529 which is incorporated herein by reference. As shown in that patent, the bridge rectifier 72 has three diodes and three controlled rectifiers and the controlled rectifiers are controlled so as to maintain a desired regulated output voltage from rectifier 72. The positive direct voltage output terminal of rectifier 72 is connected to power supply conductor 74 and its negative direct voltage output terminal is connected to ground. The conductor 74 is connected to the positive terminal of a storage battery 76 the negative terminal of which is connected to ground. The electrical loads on the motor vehicle are supplied by conductor 74 and one of these loads is designated by reference numeral 78. This load is energized when switch 80 is closed. The conductor 82 is a sense lead which senses the voltage on conductor 74 and controls the conduction of the controlled rectifiers of bridge rectifier 72 to maintain the voltage on conductor 74 constant in a manner that is described in the above-referenced Cummins et al. patent. By way of example, if the electrical system is a 12 volt system the voltage on conductor 74 may be maintained at a regulated voltage of about 14 volts.

The amount of current that is supplied to battery 76 and to the other electrical loads on the vehicle is sensed by a current transformer that is comprised of a winding 84 that is wound about power supply conductor 74. The winding 84 is connected to a load signal circuit 86. This circuit develops an output voltage on line 88 which is a function of the amount or magnitude of current being supplied to the electrical loads on the vehicle. The conductor 88 is connected to one input of an AND gate 90.

The idle speed of the engine is controlled by an idle speed control system that is of the type disclosed in the U.S. Pat. No. to Des Lauriers 4,237,833 which is incorporated herein by reference. This idle speed control comprises an electric motor 92 that drives a throttle stop 94 that engages throttle actuator lever 34. Lever 34 can be moved by accelerator pedal 96 against the force of spring 97 which tends to move throttle plate 32 toward a closed position. The spring 97 also urges lever 34 against stop 94. The stop 94 is projected or retracted by the motor 92.

The electric motor 92 that drives throttle stop 94 is powered from an idle speed control unit 106 which is connected to motor 92 by line 108. The unit 106 receives engine speed information from line 110 and may have other inputs as described in the above-referenced Des Lauriers patent. The engine speed information is provided by a magnetic pickup 112 that cooperates with a toothed wheel 114 that is driven by the crankshaft 14. The output of pickup 112 is applied to an engine speed signal shaping circuit 116, the output of which is applied to line 110. The signal on line 110 varies as a function of engine speed.

The waste gate valve 52 is controlled by an actuator 120 which receives the engine speed signal from line 122. The arrangement is such that valve 52 is opened when engine speed exceeds a predetermined high speed value.

The engine speed signal is applied to a low speed enable circuit 124 via lines 122 and 126. The output of circuit 124 is an input to AND gate 90 via line 128. The circuit 124 applies a signal to gate 90 when engine speed drops below some predetermined low engine speed. At engine speeds above the predetermined low speed no signal is developed on line 128.

The vane valve 54 is adjusted by an electric motor 130. The motor is connected to actuator lever 60 by a suitable mechanical drive which has been indicated by the dotted line 132. The lever 60 is also mechanically coupled (dotted line 134) to a shiftable wiper 136 of a variable resistor 138. The voltage developed at the wiper 136 varies with variation in the position of valve 54 and this voltage is applied to a voltage comparator 140 via line 142. The output of AND gate 90 is applied as another input to voltage comparator 140 via line 144. The voltage comparator 140 compares the voltages on lines 142 and 144 and applies an error signal to a motor control circuit 146 via line 147. Motor control circuit 146 is connected to motor 130 via line 150. The signal on line 144 is also applied to motor control 146 by line 151. With no signal on line 151 the motor control 146 operates to maintain motor 130 deenergized and spring 62 can then move vane valve 54 to a fully open position against stop 63.

It should be evident that the voltage at wiper 136 represents the actual position of valve 54. When AND gate 90 has an output the voltage on line 144 represents the desired position of valve 54 and this voltage is a function of the output current of generator 66 that is sensed by winding 84. This voltage also represents the extent to which the generator and turbine are being loaded or in other words the amount of torque required to drive the generator.

The operation of the system shown in FIG. 1 will now be described. In describing the operation of FIG. 1, some general principals of operation will be discussed first. As previously mentioned, the valve 54 can be adjusted to increase or decrease the effective turbine inlet area 56A. As the valve 54 is moved to decrease inlet area 56A the back pressure in exhaust passage 24 will increase. As the back pressure in exhaust passage 24 increases the speed of the internal combustion engine tends to decrease. Assuming that the engine is being controlled by the idle speed control system, a reduction in speed of the engine below the idle speed setting will cause the throttle plate 32 to move toward an open position thereby increasing the amount of air and fuel supplied to the engine. This increase in both air and fuel causes the magnitude of the exhaust gas mass flow, for example in pounds per hour to increase which in turn causes the speed of the rotor of the turbine 40 to increase or at least maintain some speed. In summary, the increase in back pressure within exhaust passage 24, which is caused by the movement of the valve 54 to reduce turbine inlet area 56A eventually causes the throttle valve 32 to move more toward an open position which in turn increases the exhaust gas mass flow.

With the foregoing in mind, the operation of FIG. 1 will now be described in more detail. In this description it will be assumed that the idle speed control unit 106 is set to provide an engine idle speed of 800 rpm. It will further be assumed that the low speed enable circuit 124 develops an output signal on line 128 at an engine speed which is slightly higher than the idle speed, for example 900 rpm where engine idle speed is 800 rpm. Assuming now that engine speed is below 900 rpm, the AND gate 90 will have an input signal applied thereto via line 128. The AND gate will now output a signal on line 144 that is a function of the amount of current being supplied to the electrical loads on the motor vehicle. The valve 54 will now be adjusted in accordance with the amount of current being supplied to the electrical loads on the motor vehicle. Thus, as the electrical load increases the valve 54 is moved to decrease the turbine inlet area 56A. Putting it another way, as the current sensed by winding 84 increases the back pressure in exhaust passage 24 is increased which in turn, by virtue of the idle speed control system, causes the throttle valve 32 to move to a more open position thereby increasing the exhaust gas mass flow. Thus, as previously mentioned, the increasing electrical load, as sensed by winding 84, in effect causes the engine to operate as a gas generator with sufficient exhaust gas mass flow to drive the turbine 40 at a speed that is high enough to cause a power level to be generated by the generator 66 that is sufficient to supply the electrical loads on the motor vehicle.

When the engine speed is above 900 rpm there is no signal output from the enable circuit 124 and accordingly there is no output from the AND gate 90 with the result that the motor 130 is deenergized. The spring 62 now moves the valve 54 to a fully open position.

At engine speeds above, for example 2000 rpm, the waste gate valve 52 is opened to thereby bypass some of the exhaust gas being supplied to the turbine 40.

In the design of the system shown in FIG. 1 the degree that the valve 54 restricts the turbine inlet area 56A will be related in some manner to the current output of the generator as sensed by the secondary winding 84. Thus, the system can be arranged such that valve 54 remains in a completely open position until load current reaches some predetermined value. Above this predetermined value the valve 54 can be progressively moved toward a position that progressively reduces the turbine inlet area 56A as a function of increasing load current above the predetermined value.

The embodiments of the invention in which an exclusive property or privilege is claimed are defined as follows:

1. An electric power generating system for a motor vehicle comprising, an internal combustion engine having an intake passage connected to the intake valves of the engine and an exhaust passage connected to the exhaust valves of the engine, a throttle valve for controlling the amount of air and fuel supplied to the engine through said intake passage, an exhaust gas turbine having an inlet connected to said exhaust passage, said turbine inlet having turbine inlet valve means for controlling the effective turbine inlet area, said valve means causing the back pressure in said exhaust passage to increase as said inlet area is reduced, engine speed control means responsive to engine speed for varying the position of said throttle means to maintain engine speed at a predetermined value, an electric generator connected to the rotor of said turbine so as to be driven thereby, an electrical load on said vehicle connected to the output of said generator, means for sensing the output current of said generator, and means coupled to said current sensing means and to said turbine valve means for controlling said turbine inlet valve means as a function of the magnitude of the current sensed by said sensing means, said last named means operative to decrease said effective turbine inlet area as the output current of said generator increases.

2. The power generating system according to claim 1 where the generator is an alternating current generator and wherein the output winding of the generator is connected to rectifier means for providing direct current to electrical loads on the motor vehicle.

3. The power generating system according to claim 1 where the generator is an alternating current generator that has an output winding connected to rectifier means and wherein said current sensing means senses the direct current output of said rectifier means.

* * * * *